Dec. 18, 1951   P. SCHOONENBERG ET AL   2,578,986
APPARATUS FOR MANUFACTURING STRIP-LIKE GLASS
Filed April 15, 1946   2 SHEETS—SHEET 1

INVENTORS.
PANCRAS SCHOONENBERG.
PIETER VAN ZONNEVELD.
BY
ATTORNEYS

INVENTORS
PANCRAS SCHOONENBERG.
PIETER VAN ZONNEVELD.
BY
ATTORNEYS

UNITED STATES PATENT OFFICE 2,578,986

APPARATUS FOR MANUFACTURING STRIPLIKE GLASS

Pancras Schoonenberg and Pieter van Zonneveld, Eindhoven, Netherlands, assignors, by mesne assignments, to Hartford National Bank and Trust Company, Hartford, Conn., as trustee Application April 15, 1946, Serial No. 662,148
In the Netherlands July 6, 1943

Section 1, Public Law 690, August 8, 1946
Patent expires July 6, 1963

3 Claims. (Cl. 49—17)

In drawing glass it is a well-known phenomenon that contraction of the glass occurs in the transverse direction. If, for example, glass wire is desired to be drawn, the drawing aperture of the glass furnace must have a diameter which exceeds by a multiple the diameter of the glass wire to be manufactured. For glass wire having a diameter of 10 microns a drawing aperture having a diameter of 10 mms. for example is required, so that the contraction is 1 to 1000. If a glass strip were to be drawn in a similar manner and hence if it would be desired to manufacture, from the molten glass, a product whose width is a multiple of the thickness of the body it would be necessary to start with a slit-like drawing aperture whose two dimensions are chosen in connection with the contraction to be anticipated. If, as before, a contraction coefficient of 1 to 1000 is calculated with and if the strip were to be given a thickness of 10 microns and a width of 10 mms., the minimum dimension of this slit would be 10 mms. but the maximum dimension 10 m. and this is naturally impracticable.

The present invention provides means by which the drawing of strip-like glass becomes very readily feasible.

The invention consists in an apparatus for manufacturing strip-like glass, a supply of molten glass being drawn from a furnace through a drawing aperture shaped into such a form that the glass strip thus formed is provided at its two edges with rod-like parts which extend in the direction of length of the strip and which in the direction of thickness of the strip have a larger dimension than the strip itself, the temperature of the rod-like parts being chosen to be lower at the area of the aperture for outflow from the glass furnace than the temperature of the glass film intermediate the said rod-like parts.

By adopting the method according to the invention the following favourable effect is obtained.

Owing to the presence on the glass of the rod-like parts which even at the area of the aperture for outflow from the furnace exhibit a lower temperature than the intermediate glass film the contraction in the direction of width of the strip is reduced to a very marked extent, since due to their comparatively low temperature the glass rods have already lost a large part of their plasticity and are therefore capable of largely withstanding the forces that might lead to a marked contraction of the glass film intermediate the rod-like parts. This permits of manufacturing a strip of a definite width by means of a drawing aperture which from a technical viewpoint can be readily constructed. Control of the temperature difference between that part of the outflow aperture where the film is formed and those parts of the aperture where the rod-like parts are formed permits of controlling the extent of contraction and hence also the thickness of the film.

One device particularly suitable for carrying out the method according to the invention is characterized by the feature that the drawing opening is slit-shaped and at its ends exhibits parts which in the direction of the smallest dimension of the slit have a dimension which exceeds this smallest slit dimension, these parts at the ends of the drawing slit being housed in nozzle-like extensions of the device which on the side adjacent the slit-like part of the drawing aperture, also exhibit a slit-like recess. The presence of the nozzle-like extensions on the device ensures that on being formed the glass rods automatically assume a lower temperature than the intermediate glass film. In addition, the nozzles permit of separately heating or cooling the glass flowing through them and this is important if the temperature difference between the glass rods and the glass film is to be reduced or increased. When in one embodiment of this device the slit-like part of the drawing aperture and the slit-like recesses in the nozzle-like extensions are separated by dams contained in the nozzles there is the advantage that the union between the rod-like extensions and the glass film is very sudden and this assists in the removal of the glass rods from the glass film that may be necessary. This device is preferably made of platinum or a platinum alloy, such as platinum rhodium or platinum iridium.

The invention consists in a method of drawing the strip-like glass and this method may be carried out by means of a drawing device whose part acting as the drawing member and formed for example by the peripheral surface of a drum is perforated and is moved in succession over an enclosure in which there is a pressure below atmospheric pressure and over an enclosure in which there is a pressure above atmospheric pressure.

According to the invention, for the purpose of removing the rod-like glass parts from the glass strip it is possible to adopt such method that the glass strip is fed between two pressure members that may be constructed as pressure rollers and which are so arranged relatively to each other that on the glass strip being passed through the rod-like glass parts are smashed and the glass strip remains intact.

The method according to the invention may be used for the manufacture of strip-like glass in a great variety of thicknesses. Apart from being readily adapted for the manufacture of glass strips having a thickness of several millimeters, this method is also highly suitable for the manufacture of glass strips of minute thickness, for example of the order of magnitude of 10 microns. Strip-like glass of this latter thickness may be used for example as starting material for the manufacture of glass laminae used for example for insulating purposes. As before, it is necessary to sever the glass rods from the intermediate film because it is this very intermediate film which must serve as starting material for the manufacture of the glass laminae. According to the invention, to secure this effect the glass strip that has been manufactured in the manner above described and whose film has the desired thickness, may be broken when cooled and the glass laminae and small glass rods produced as a result of the said breaking operation may then be assorted. According to the invention, this assorting operation may be effected by introducing the glass rods and glass laminae into a flow of liquid with the result that the glass rods sink by reason of their larger weight and the glass laminae are carried along by the flow of liquid and may be gathered at a suitable point.

In order that the invention may be clearly understood and readily carried into effect it will now be described more fully with reference to the accompanying drawings.

Figure 1:
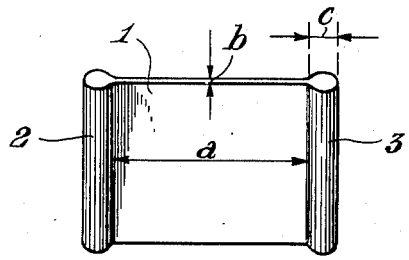
Fig. 1 is a perspective view in elevation of a piece of strip-like glass produced according to the invention.

Fig. 1 is a perspective view of a piece of the strip-like glass that is manufactured by the method according to the invention. It is formed by a glass film 1 and two rod-like parts 2 and 3 between which the film is so to say stretched. In order to gain an impression of the size of this strip-like glass it must be observed that the width $a$ of this film is 20 mms. and the thickness $b$ of this film is 10 microns. The diameter $c$ of the rods 2 and 3 is 0.3 mm. The length in which the strip can be manufactured is theoretically unlimited. It is obvious that by varying the dimensions of the drawing device it is possible to manufacture strip-like glass of practically any desired width and thickness.

Figure 2:
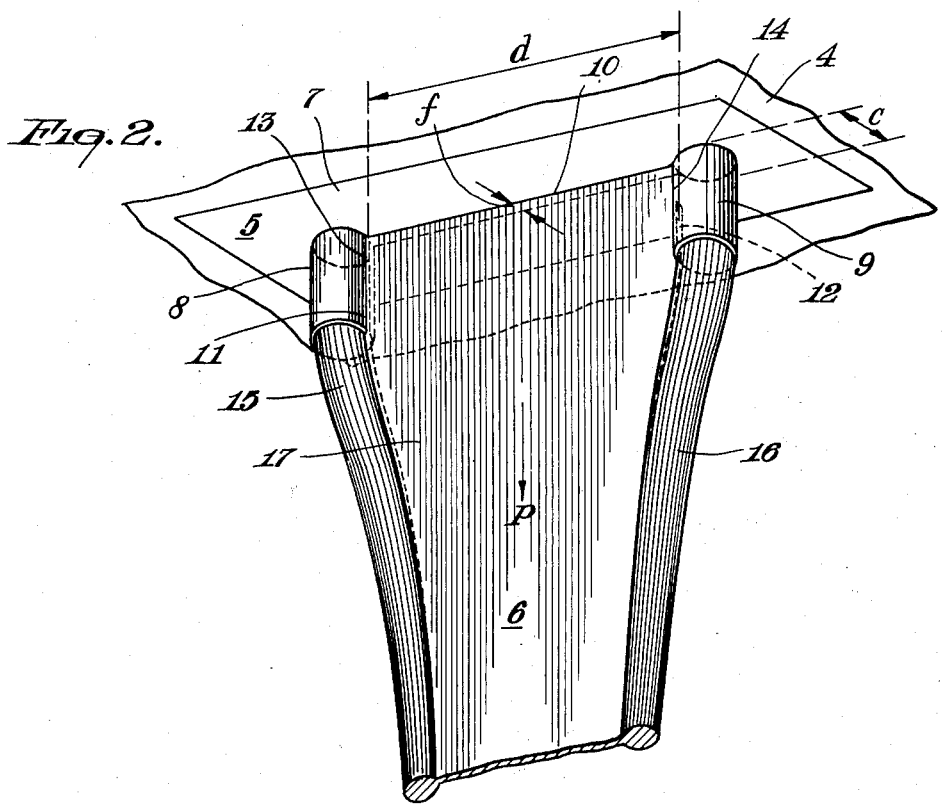
Fig. 2 is a perspective view of the glass drawing apparatus producing the strip-like glass of Fig. 1 according to the invention.

Figure 2 is a perspective view of the member which contains the drawing aperture for such glass and is intended to be mounted on a glass furnace. In this figure, 4 designates the bottom of the glass furnace, 5 the member comprising the drawing aperture and 6 the glass strip drawn from this aperture. The member 5, which is made of platinum, is primarily formed by a plate 7 and two nozzles 8 and 9 which are constructed in the form of hollow cylinders and have their open upper ends secured in corresponding recesses in the plate 7. A slit 10 extends between these two nozzles whose wall on the side adjacent the slit 10 comprises a slit designated 11 and 12 respectively in the figure. The slit 10 is separated from the slits 11 and 12 by dams 13 and 14 in the wall of the nozzles.

On the molten glass being drawn from the drawing aperture, an operation which is effected in the direction of the arrow P, molten glass flows through the nozzles 8 and 9 and forms glass rods 15 and 16 whilst at the same time a further supply of molten glass flows through the slit 10 and forms the film 17. These amounts of glass separated in the immediate proximity of the slit 10 by the dams 13 and 14 adhere to each other at the top of the slits 11 and 12 in the nozzles 8 and 9 respectively. As the molten glass that forms the rod 15 and 16 is already slightly cooled in the nozzles 8 and 9, the glass rods 15 and 16 will have a lower temperature at the moment of leaving the nozzles 8 and 9 than the glass that leaves the slit 10 and forms the film 6. This enables the glass rods to eliminate to a great extent the detrimental effect of the forces that tend to contract the glass strip in the direction normal to the arrow P. This results in the contraction in the direction of width of the strip remaining comparatively slight. For the purpose of drawing for example a strip having the dimension shown in Figure 1, a drawing aperture may be started with whose dimension $d$ or else the length of the slit 10, is 70 mms., whereas the diameter $c$ of the nozzles 8 and 9 is about 13 mms. Special precautions to avoid contraction in the direction of thickness of the band having not been taken, the contraction in this direction is much more intense; the dimension $f$ of the slit 10, which is consequently decisive for the dimension $b$ of the strip in Figure 1, is 2.75 mms., whereas, as stated before, the thickness $b$ of the band is 10 microns.

Figure 3:
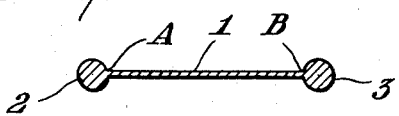
Fig. 3 is a cross-sectional view of the piece of strip-like glass of Fig. 1.

The favourable effect of the baffles 13 and 14 between the slit 10 on the one hand and the slits 11 and 12 on the other hand may be demonstrated with reference to Figure 3, which is a cross-sectional view of the glass strip shown in Figure 1. It follows from this figure that the union between the rod-like parts 2 and 3 and the film 1 (at the points A and B) is most sudden, a phenomenon which would occur in a much lesser degree if these baffles were not provided and the slit 10 would therefore merge into the slots 11 and 12.

Figure 4:
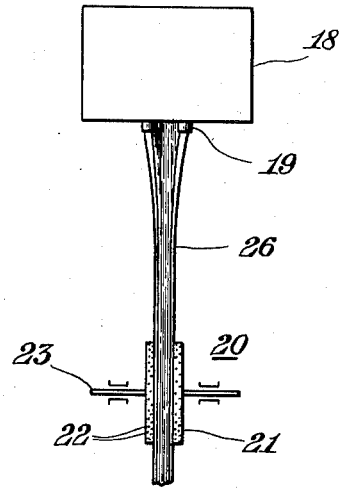
Fig. 4 is a front diagrammatic view in elevation of the glass furnace together with the drawing device and the classifying device employed according to the invention.
Figure 5:
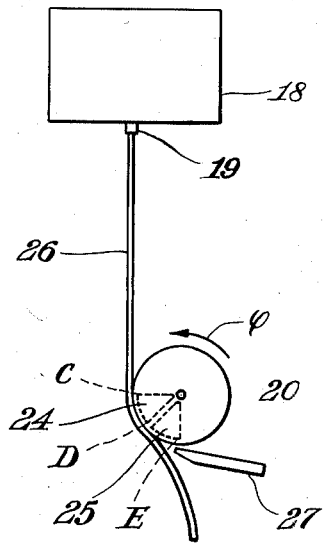
Fig. 5 is a side view in elevation of the apparatus of Fig. 1.

Figures 4 and 5 are two diagrammatic elevations of the glass furnace together with the drawing device. The glass furnace is designated 18, the member giving the shape to the glass matter 19 and the drawing device proper 20. The latter comprises a drum 21 whose peripheral surface comprises perforations 22, said drum being adapted to rotate about a shaft 23 and being driven from a motor not shown. The drum turns over two stationary chambers 24 and 25, means being provided for permanently maintaining a pressure below atmospheric pressure in the chamber 24 and a pressure above atmospheric pressure in the chamber 25. The walls of these chambers which adjoin the inner surface of the shell of the drum 21 being also perforated the glass strip 26 will be sucked in through the path CD, if the drum 21 rotates in the direction of the arrow Q, and will again be blown off through the path DE; this action may be assisted by a blow pipe 27 by which air is blown between the glass strip and the peripheral surface. Thus, the drawing effect, aimed at, on the supply of glass flowing from the glass furnace and formed in the device 19 is ensured.

Figure 6:
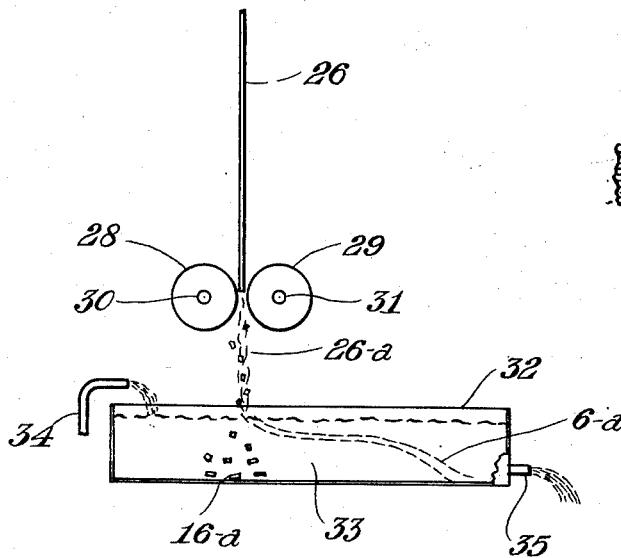
Fig. 6 is a side view of the means for crushing both the rod-like portions and the strip-like portions and classifying the said portions according to the invention.
Figure 7:
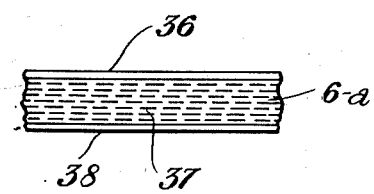
Fig. 7 is a sectional view of the use of the laminae when formed into an insulating material.

Fig. 6 is a more or less diagrammatic presentation of a means for crushing both the end rod-like portions and the strip-like portions. The form 26 is passed between two rotors 28 and 29 rotated by the shafts 30 and 31 to be broken into the portions 26-a falling into the water 33 as rod-like portions 16-a and laminae portions 6-a. The water 33 is admitted to the reservoir 32 from the source 34 to form a liquid current as indicated by the arrow to carry the laminae 6-a to the right as shown by Fig. 6. The water is maintained at an approximately constant level by the orifice means 35. In one embodiment of my invention as shown by Fig. 7, the laminae 6-a of Fig. 6 are collected together to form a mat-shaped member 37 with outside covers 36 and 38. The said mat-shaped member 37 may be used as an insulating medium.

What we claim is:

1. Apparatus for manufacturing strip-like glass having a thickness of the order of 10 microns, which comprises a glass drawing member, said drawing member being provided with a slit-like central channel and nozzle-like tubular end channels with slit-like recesses, the dimensions of the said end channels in the direction of the smallest central channel dimension being greater than the said smallest central channel dimension, the slit-like recesses in the said end channel portions and the said central channel being separated by dam portions and means spaced from said central and tubular channels for pulling glass through the said channels.

2. Apparatus for manufacturing strip-like glass having a thickness of the order of 10 microns, which comprises glass drawing means, said drawing member being provided with a slit-like central channel and tubular end channel portions with slit-like recesses, the dimensions of the said end channel in the direction of the smallest central channel dimension being greater than the said smallest central channel dimension, the slit-like recesses in the said end channel portions and the said central channel being separated by dam-like portions of the said end channel portions, said drawing means further comprising a rotary drum having a perforated peripheral surface, the said surface being arranged around two chamber-like portions, said chamber-like portions being provided with means to cause a pressure below atmospheric pressure to prevail in one of the said chambers, and a pressure above the atmospheric pressure to prevail in the other of said chambers.

3. Apparatus for manufacturing strip-like glass having a thickness of the order of 10 microns, comprising a glass drawing member provided with a slit-like central channel having an outer edge portion and nozzle-like tubular end channel members with slit-like recesses, the dimensions of the said end channels in the direction of the smallest central channel dimension being greater than the said smallest central channel dimension, the said end channel members extending beyond the said outer edge portion of said central channel, and means spaced from said central and tubular channels for pulling glass through the said channels.

PANCRAS SCHOONENBERG.
PIETER van ZONNEVELD.

REFERENCES CITED

The following references are of record in the file of this patent:

UNITED STATES PATENTS

| Number | Name | Date |
| --- | --- | --- |
| 805,065 | Hitchcock | Nov. 21, 1905 |
| 1,398,109 | Marconet et al. | Nov. 22, 1921 |
| 1,617,653 | Shields | Feb. 15, 1927 |
| 1,681,258 | Rowley | Aug. 21, 1928 |
| 1,692,615 | Blair | Nov. 20, 1928 |
| 1,753,805 | Reece | Apr. 8, 1930 |
| 2,251,727 | Wellech et al. | Aug. 5, 1941 |
| 2,259,716 | Zellers | Oct. 21, 1941 |
| 2,342,891 | Powers | Feb. 29, 1944 |
| 2,422,466 | Brown | June 17, 1947 |